April 14, 1970  C. J. MOUFFLET  3,506,384
CATALYTIC HEATERS
Filed Feb. 19, 1968

INVENTOR :
CLAUDE J. MOUFFLET

United States Patent Office 3,506,384
Patented Apr. 14, 1970

3,506,384
CATALYTIC HEATERS
Claude J. Moufflet, Paris, France, assignor of one-half to AUER, Societe Francaise d'Incandescence Par le Gaz, Paris, France, a company of France
Filed Feb. 19, 1968, Ser. No. 706,409
Int. Cl. F23q 9/08
U.S. Cl. 431—53    8 Claims

ABSTRACT OF THE DISCLOSURE

A catalytic heater which provides, along the lower edge of the catalytic screen through which the gas passes, a gas-collector. In the lowest part of this collector a pilot flame is alight so that as soon as some gas has passed through the screen and into the collector, it blazes up, beginning to warm the screen. The conflagrations follow one another until the screen has reached a temperature where the catalytic reaction may occur.

BACKGROUND OF THE INVENTION

There is a need in catalytic heaters making possible to light catalytic panels in a much shorter time than previously known in the prior art and consequently reduce the troublesome procedure in igniting the heater and obtaining the catalytic temperature at the screen encountered by users of such heaters.

Prior hereto an auxiliary burner was provided at the bottom of the catalytic screen, to warm the screen so that the catalytic reaction could occur.

The user of the heater had to press a button that let the gas come to the burner to light the burner and to wait from 45 seconds to 2 minutes pressing the button until the temperature required for the catalytic reaction had been reached.

If it happened that the user released the button too soon, the procedure had to be repeated from the beginning. This is a tedious and tiring process.

Thus, what is needed is a catalytic heater making possible to light catalytic pannels in a much shorter time than previously known and consequently reduce the drawback of the troublesome procedure mentioned above.

SUMMARY OF THE INVENTION

This invention relates to catalytic heaters involved in domestic, industrial or commercial applications, utilizing the principle of flameless combustion of gases such as butane or propane by means of a catalyst such as platinum, palladium or rhodium.

The catalyst is incorporated in the threads of a gas-porous screen or strainer generally made of asbestos.

For starting the operation of the heater, this screen has to be subjected to an initial previous heating or "foreheating" so that it reaches the required temperature for the catalytic reaction.

This heating can be obtained either by an electric resistance which makes the set more complex or by lighting the gas that passes through the screen, the discharge of which is greater during the foreheating period.

The latter method is the most generally used for domestic applications because it requires only one power-feeding which makes use of the very gas of the heater itself.

The drawback of this method is to oblige the user of the heater to initially operate the same during a period of time of approximately 45 seconds to 2 minutes.

Some temporizing or control devices may be provided so that the components involved in the initial starting of the heater are kept working during the foreheating period. But this also makes the heater a more complex structure.

By this invention the time during which the user has to operate the initial foreheating may be shortened by an easy and reliable method.

For this purpose, a gutter like gas-collector is provided all along the lower edge of the screen with a pilot flame lighted in the lowest part of the screen.

As soon as an adequate supply of gas has come through the screen and, by means of the collector, has met the pilot flame, this gas blazes up, and commences to heat the screen. As the discharge of the gas through the screen is slow, the conflagration is short but further conflagrations continued in a consecutive manner and at an increasing rate, until the screen is warm enough for the gas burning to become catalytic.

For a more efficient working, a device such as a thermoelectric couple is added to the pilot flame and subjected to its flame to control the gas feeding of the heater, such as, for example, by means of an electromagnetic valve.

For the starting of the set, the user has only to keep the gas-feeding open while he ignites the pilot flame taking only some few seconds, his actual operation being maintained as short as possible.

The following description and the accompanying drawings will serve as an illustration but not intended as a limitation of this invention.

Figure 1:
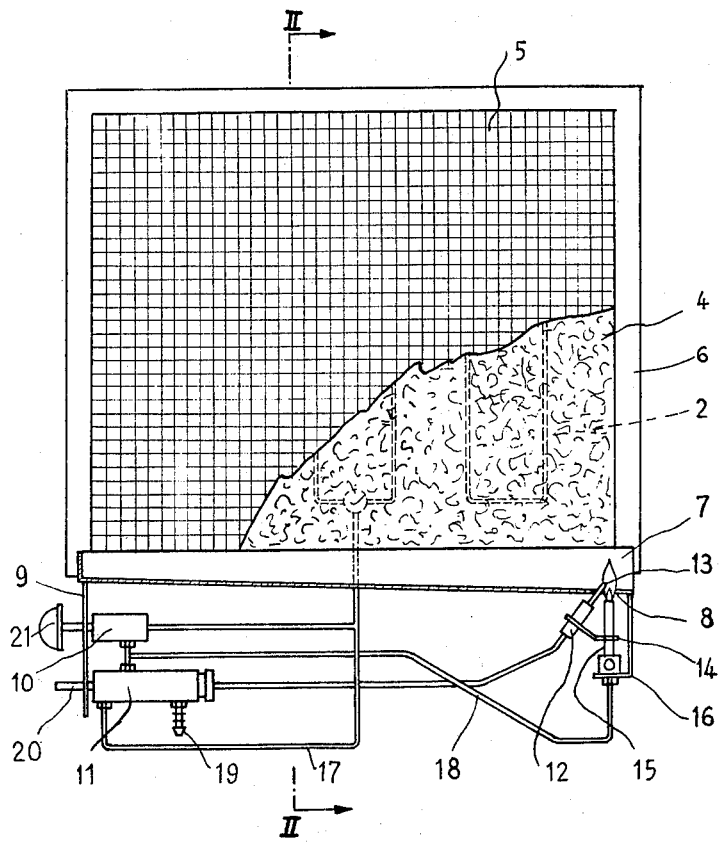
FIGURE 1 is a semidiagrammatic vertical section of one embodiment comprising this invention.

In the practical application shown by the drawing, the set is made of a container 1 in which a gas distributor 2 made of a conveniently bent pipe with many holes 3 positioned to face toward the back of the container and a gas porous cushion 4 of mineral thready material are provided. A gas porous screen 5 closes the container. The screen 5 is a strainer made of asbestos cloth impregnated with active material, such as pulverized alumina to which particles of platinum or of further convenient catalytic material are clung. Screen 5 is held fast by a frame 6 riveted on the edges of container 1.

On the lower edge of frame 6 a U-shaped gas-collector 7 some few centimeters wide is secured.

Figure 2:
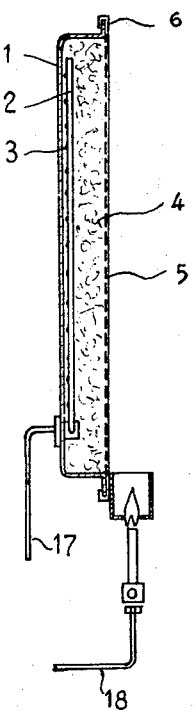
FIGURE 2 is a vertical section of FIG. 1 made along the line II—II of FIG. 1.
Figure 3:
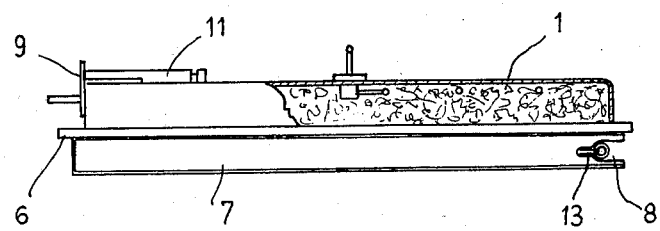
FIGURE 3 is a semidiagrammatic horizontal section of FIG. 1.
Figure 4:
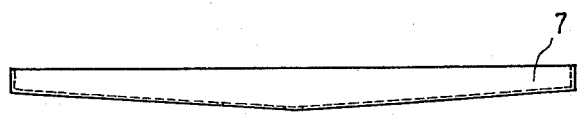
FIGURES 4 and 5 are respectively vertical and plan views of a further embodiment of a gas-collector according to this invention.
Figure 5:
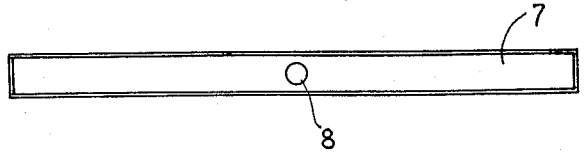

The gas-collector, closed on both ends, is somewhat larger than screen 5 as shown in FIG. 1. An opening 8 has been made in the lowest part of its bottom, either near an end as illustrated by FIGS. 1 to 3 or in another place, for instance, near the middle of the collector as illustrated in FIGS. 4 and 5.

A control cock 10 and an electromagnetic valve 11, the coil of which is fed by a thermoelectric couple 12, are fastened to a holder 9 secured under container 1.

The soldered joint of couple 12 passes through hole 8. Couple 12 is fastened to a corner plate 14 which is fastended to the pipe 15 of pilot flame. This pipe is fixed on a holder 16 which in turn is fastened to container 1 in such a way that the pilot flame passes through hole 8 and heats the soldered joint 13 of the thermoelectric couple 12.

Gas distributor 2 is fed by a gas pipe 17 controlled by electromagnetic valve 11 while pipe 15 of the pilot flame is fed by a gas pipe 18 from the pipe union which connects valve 11 to control cock 10. The valve has a setting push-button 20 and is gas fed by a pipe 19.

Control cock 10 is operated by means of a knob 21.

The process of operation of the above described heater device is as follows:

When push-button 20 is pressed, valve 11 opens and feeds gas through pipe 18 to pipe 15 of the pilot flame. As soon as the pilot flame is lit soldered joint 13 of thermoelectric couple 12 is heated. The electric current generated maintains valve 11 open. Push-button 20 may then be released so that the user has only to press upon the button a duration of a few seconds necessary to light the pilot flame.

By means of control cock 10 the desired discharge of gas is fed to the screen 5.

The holes 3 of distributor 2 are facing toward the back of the container so that the gas does not filter through the cushion 4 and pass quickly through screen 5.

For the starting of the heater, as the screen is cold, the gas spreads to the porous cushion 4, passes through screen 5 and because of the density of the gas, falls into gas-collector 7 which by convection conveys the gas to pilot flame 15.

As soon as the gas comes to the area of pilot flame this gas is ignited and the gas which is just above the collector 7 in the screen 5 is also ignited and begins to heat the screen.

As the discharge of the gas which passes through the screen is small and the flow of the gas slow, this conflagration does not last long. After it has ceased, the gas continues on again passing through the screen and falling into the collector. The above described process takes place again and the conflagrations follow one after another until the screen has reached the convenient temperature to which all the gas that passes through it is consumed by catalytic reaction.

The above described process takes place every time the catalytic heater is ignited, for every discharge of the control cock, whatever may be the ambient temperature of the room to be heated.

The warmer the screen, the quicker the catalytic temperature is reached.

From measures that have been made with a heater constructed in accordance with this invention, it appears that the percentages of unburnt gases are less than 5%.

Safety is obtained by utilizing pilot flame 15 because if it fails, the thermoelectric couple 12 stops generating current and valve 11 shuts the feeding of gas to the set.

In another objective of this invention, the pilot flame is also an atmosphere control device for detection of carbon dioxide $CO_2$. The heater fails to maintain ignition as soon as the $CO_2$ ratio has reached a specified amount.

Further safety devices may be added to the set, for instance a device by means of which the gas feeding of the screen is controlled by the temperature of a good oxidation.

The lighting or ignition process may be accelerated if a small additional discharge of gas is fed straight into the gas collector.

It is obvious that changes brought to the above described features, specially by substituting technically equivalent structural features, are within the scope of the invention.

I claim:

1. In a catalytic heater having an upright frame for supporting a catalytic panel having an upright front catalytic screen, an upwardly open gas collector secured adjacent the bottom of said upright catalytic screen with an opening provided in the bottom thereof, a pilot light for igniting said heater positioned below said opening with the pilot flame projecting therethrough.

2. In the catalytic heater of claim 1, said collector characterized by a downwardly sloping bottom therein, said opening provided in the lowest point of said collector bottom.

3. In the catalytic heater of claim 2, said gas collector characterized in that said collector bottom slopes downwardly from one end of the same to the other end for the full width of said catalytic screen with said opening at said other end in said collector bottom.

4. In the catalytic heater of claim 2, said gas collector characterized in that said collector bottom slopes downwardly from each end of said collector to the central point thereof with said opening at said collector bottom central point.

5. The catalytic heater of claim 1 characterized by an upright tubular gas distributor positioned within said catalytic panel aligned with and behind said catalytic screen, a plurality of spaced and substantially aligned apertures positioned along the length of said distributor facing in an opposed direction from said catalytic screen.

6. The catalytic heater of claim 5 characterized in that said heater frame includes a back panel, said gas distributor supported from said back panel with said distributor apertures positioned in a direction facing said back panel.

7. The catalytic heater of claim 5 characterized by a gas porous cushion between said upright tubular gas distributor and said upright catalytic screen.

8. The catalytic heater of claim 5 characterized by thermoelectric means secured adjacent to said pilot light for reception in the pilot flame, an electromagnetic gas valve operative by said thermoelectric means when said pilot light is lit, a manual push button for said electromagnetic gas valve to permit said pilot light to be lit and hold said electromagnetic gas valve in its open position to supply gas to said distributor to cause ignition of and reoccurring conflagrations in the heater.

References Cited

UNITED STATES PATENTS

| | | | |
|---|---|---|---|
| 3,037,554 | 6/1962 | Risse | 431—77 |
| 3,114,410 | 12/1963 | Schneider | 431—285 |
| 3,291,115 | 12/1966 | Forniti | 431—328 X |

CARROLL B. DORITY, Jr., Primary Examiner

U.S. Cl. X.R.

431—192, 285, 329